US006537364B2

(12) United States Patent
Dietz et al.

(10) Patent No.: US 6,537,364 B2
(45) Date of Patent: *Mar. 25, 2003

(54) PROCESS FOR FINE DIVISION OF ORGANIC PIGMENTS BY PRECIPITATION

(75) Inventors: Erwin Dietz, Königstein (DE); Joachim Weber, Frankfurt am Main (DE); Dieter Schnaitmann, Eppstein (DE); Christian Wille, Weinheim (DE); Leonhard Unverdorben, Nidderau (DE); Klaus Brychcy, Frankfurt am Main (DE)

(73) Assignee: Clariant GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,496

(22) Filed: Oct. 5, 2001

(65) Prior Publication Data

US 2002/0040665 A1 Apr. 11, 2002

(30) Foreign Application Priority Data

Oct. 5, 2000 (DE) .......................... 100 49 201

(51) Int. Cl.⁷ .......................... C09B 67/04; C09B 67/00; C09B 67/20
(52) U.S. Cl. ....................... 106/493; 106/412; 106/494; 106/495; 106/496; 106/497; 106/498; 241/5; 241/15; 241/18; 241/24.1
(58) Field of Search ................ 106/493, 494, 106/495, 496, 497, 498, 412; 241/5, 15, 18, 24.1

(56) References Cited

U.S. PATENT DOCUMENTS

| | | | | |
|---|---|---|---|---|
| 3,607,336 A | * | 9/1971 | Jaffe | 106/495 |
| 5,837,041 A | | 11/1998 | Bean et al. | 106/31.6 |
| 6,340,387 B1 | | 1/2002 | Orth-Gerber et al. | 106/447 |

FOREIGN PATENT DOCUMENTS

| | | |
|---|---|---|
| DE | 199 10 521 | 9/2000 |
| EP | 0 075 182 | 3/1983 |
| EP | 0 737 723 | 10/1996 |
| EP | 737723 | * 10/1996 |
| EP | 0 807 668 | 11/1997 |
| WO | 00/44673 | 8/2000 |

OTHER PUBLICATIONS

EPO Search Report for EP Application No. 01122051, mail date Jan. 22, 2002.
Abstract XP–002186544, "New non–clogging microreactor for chemical processing and nano materials", The Institution of Electrical Engineers, Sep. 27, 2002.
U.S. application Ser. No. 09/971,495, filed Oct. 5, 2001, Dietz, et al.
U.S. application Ser. No. 09/972,082, filed Oct. 5, 2001, Dietz, et al.
U.S. application Ser. No. 09/972,102, filed Oct. 5, 2001, Dietz, et al.
English abstract translation of EP 0 075 182, Mar. 30, 1983.

* cited by examiner

Primary Examiner—Anthony J. Green
(74) Attorney, Agent, or Firm—Anthony A. Bisulca

(57) ABSTRACT

The invention provides a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

22 Claims, No Drawings

PROCESS FOR FINE DIVISION OF ORGANIC PIGMENTS BY PRECIPITATION

BACKGROUND OF THE INVENTION

Organic pigments have been known for a long time and have acquired great industrial importance for pigmenting high molecular mass organic materials such as paints, plastics or printing inks. At the synthesis stage, the pigments are often obtained in the form of coarsely crystalline crude pigments which at that stage do not meet the technical requirements. They must first be subjected to a process of fine division which brings about a reduction in particle size. This is commonly followed by a heat treatment, in order to obtain pigments meeting the technical requirements, or pigment dispersants or other additives are used in order to achieve specific effects, as described for example in EP-A-0 807 668.

In order to convert a crude pigment into pigmentary or prepigment form, a variety of fine division processes are known, examples being acid pasting (reprecipitation from solvents, particularly acids), dry grinding, and wet grinding processes. In the course of the dry and wet grinding techniques, grinding media cause abrasion and so lead to foreign substances being carried into the product.

U.S. Pat. No. 3,607,336 describes an acid pasting process. The pigment is dissolved in sulfuric acid and precipitated in turbulent flow. The turbulent flow precipitation is disclosed to produce a finer particle than was hitherto possible with the conventional precipitation variants.

EP-A-0 075 182 describes an acid pasting process that uses polyphosphoric acid as the solvent.

EP-A-0 737 723 describes a process for precipitating pigments from solutions in polar solvents and aqueous alkali.

SUMMARY OF THE INVENTION

It is an object of the present invention to develop a universally applicable and industrially reliable process for the fine division of organic pigments by precipitation, which prevents the possibility of contamination by foreign substances and produces especially fine particles with a particularly narrow size distribution.

It has been found that the object of the invention may be achieved, surprisingly, through the use of a microjet reactor.

DESCRIPTION OF THE PREFERRED EMBODIMENTS

The present invention provides a process for the fine division of pigments which comprises dissolving one or more coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, appropriately via one or more pumps, preferably high-pressure pumps, a gas or an evaporating liquid being passed into the reactor chamber through an opening in the housing for the purpose of maintaining a gas atmosphere in the reactor chamber, especially at the point of collision of the jets, and where appropriate of effecting cooling as well, and the resulting pigment suspension and the gas or the evaporated liquid being removed from the reactor through a further opening in the housing by means of overpressure on the gas entry side or underpressure on the product and gas exit side.

Crude pigment fine division in accordance with the invention requires intensive, rapid, uniform, and reproducible mixing of the precipitation medium with the pigment solution. This is brought about by spraying the solution of the pigment that is used and the precipitation medium into the reactor chamber under a pressure of at least 10 bar, preferably at least 50 bar, in particular from 50 to 5000 bar.

In order to prevent material wear on the inner surfaces of the housing, the collision point is shifted into the material-remote gas space. By "material-remote" here is meant that, in the vicinity of the collision point of the jets, a gas atmosphere is maintained by means of the introduced gas or evaporating liquid. This means that the collision point at which the jets impinge on one another is not sited on a vessel wall or on a pipe wall. This prevents the material wear that would occur at the point where cavitation takes place on material walls. Cavitation occurs particularly when using high pressures, especially at pressures above 3000 bar. Moreover, the colliding jets are not braked by the gas atmosphere prior to their collision, as would be the case, for example, if they had to pass through a liquid.

The material of the nozzles should be as hard and thus low-wearing as possible; examples of suitable materials include ceramics, such as oxides, carbides, nitrides or mixed compounds thereof, with preference being given to the use of aluminum oxide, particularly in the form of sapphire or ruby, although diamond is also particularly suitable. Suitable hard substances also include metals, especially hardened metals. The bores of the nozzles have diameters of less than 2 mm, preferably less than 0.5 mm and in particular less than 0.4 mm.

The microjet reactor may be configured as a two-jet, three-jet or multijet reactor, preference being given to a two-jet configuration. In a case of an arrangement with two jets, the jets preferably strike one another frontally (180° angle between the jets); in the case of a three-jet arrangement, an angle of 120° between the jets is appropriate. The jets advantageously may be mounted in a device which can be adjusted to the point of conjoint collision. As a result of these different embodiments it is possible, for example, to realize different volume ratios of the pigment solution to the precipitation medium which are required for the precipitation. For example, the pigment solution may be sprayed to a point of conjoint collision through 1, 2 or more nozzles, preferably through one nozzle, and independently thereof the precipitation medium may be sprayed to the same point through 1, 2 or more nozzles, preferably through 1, 2 or 3 nozzles.

In one particularly preferred embodiment of the process of the invention, the pigment solution and the precipitation medium are sprayed against one another frontally through two opposed nozzles by means of two high-pressure pumps. A further particularly preferred embodiment of the process of the invention is a three-jet reactor in which, for example, by means of a high-pressure pump the pigment solution is sprayed to the point of conjoint collision through one nozzle and by means of a second high-pressure pump the precipitation medium is sprayed to the same point through two nozzles.

The nozzle of the pigment solution and that of the precipitation medium may have different diameters. The nozzle through which the precipitation medium is sprayed appropriately has a diameter which is from 0.2 to 5 times, preferably from 0.3 to 3 times, that of the nozzle through which the pigment solution is sprayed.

The temperatures of the supplied pigment solution and of the precipitation medium are situated appropriately in the range from −50 to 250° C., preferably between 0 and 190° C., particularly between 0 to 170° C. It is also possible to operate under pressure at above the boiling point of the pigment solution or of the precipitation medium.

Where necessary, the introduced gas or the evaporating liquid that is used to maintain the gas atmosphere in the inside of the housing may be used for cooling. Additionally, an evaporating cooling liquid or a cooling gas may be introduced into the reactor chamber by way of an additional bore in the housing. The aggregate state of the cooling medium may be conditioned by temperature and/or pressure. The medium in question may comprise, for example, air, nitrogen, carbon dioxide or other, inert gases or liquids having an appropriate boiling point under increased pressure. It is possible here for the transition of the cooling medium from the liquid to the gaseous state to take place in the reactor itself by virtue of the fact that heat released in the course of the precipitation brings about the change in aggregate state. It is also possible for the evaporative cooling of an expanding gas to be utilized for cooling. The housing enclosing the reactor chamber may also be constructed in such a way that it is thermostatable and may be used for cooling; or else the product may be cooled after it has exited the housing. The pressure in the reactor chamber may, for example, be set and maintained by means of a pressure maintenance valve, so that the gas used is present in the liquid or supercritical or subcritical state. Thus it is possible, for example, to utilize the evaporative cooling of a gas.

If operation is to take place at elevated temperature, the energy required for heating may be supplied prior to the emergence from the nozzles of the pigment solution and/or the precipitation medium—for example, in the supply lines—or by way of the thermostatable housing or the introduced gas. In principle, owing to the high pressures in the high-pressure lances, the chosen temperature may also be situated a considerable way above the boiling point of the solvent or precipitation medium. Suitable solvents and precipitants therefore include those which, at the temperature of precipitation in the interior of the housing under atmospheric pressure, are present as gases. The pigment solution and the precipitant may also differ in temperature.

For fine division by the process of the invention it is appropriate to use the coarsely crystalline crude pigments obtained in the course of their synthesis or their purification, mixtures of these crude pigments, pigment preparations of these crude pigments, surface-treated crude pigments or coarsely crystalline mixed-crystal crude pigments.

Examples of suitable coarsely crystalline crude pigments include those from the group of the perylenes, perinones, quinacridones, such as unsubstituted quinacridone of the beta or of the gamma phase or else quinacridone mixed-crystal crude pigments, quinacridonequinones, anthraquinones, anthanthrones, benzimidazolones, disazo condensation pigments, azo pigments, indanthrones, phthalocyanines, such as chlorinated CuPc, unchlorinated CuPc of the alpha or beta phase, metal-free phthalocyanines or phthalocyanines with different metal atoms such as aluminum or cobalt, for example, dioxazines, e.g., triphendioxazines, aminoanthraquinones, diketopyrrolopyrroles, indigo pigments, thioindigo pigments, thiazineindigo pigments, isoindolines, isoindolinones, pyranthrones, isoviolanthrones, flavanthrones, and anthrapyrimidines, individually, in mixtures or as mixed crystals, e.g., of two or three such pigments.

Coarsely crystalline crude pigments are crude pigments which are only suitable for pigmenting organic materials after their particles have been reduced in size. In the majority of cases, these crude pigments have an average particle size $D_{50}$ of more than 1 $\mu$m.

Suitable solvents include all liquids such as organic solvents, acids, and alkalis, and mixtures thereof, with or without the addition of water, of which it is necessary to use at most 40 times the amount by weight, preferably at most 25 times the amount by weight, in particular at most 15 times the amount by weight, based on the weight of the crude pigment to be dissolved, in order to achieve complete dissolution of the crude pigment. From an economic standpoint, therefore, appropriate solutions are those whose dissolved pigment fraction is from 2.5 to 40% by weight, preferably from 5 to 20% by weight, based on the overall weight of the solution.

Solvents used are preferably acids such as sulfuric acid, in the form for example of 96% strength by weight sulfuric acid, as the monohydrate, or as oleum; chlorosulfonic acid, and polyphosphoric acid, individually or in a mixture. These acids may also be used as mixtures with one or more organic solvents, such as alcohols having from 1 to 10 carbon atoms, examples being methanol, ethanol, n-propanol, isopropanol, butanols, such as n-butanol, sec-butanol, and tert-butanol, pentanols, such as n-pentanol and 2-methyl-2-butanol, hexanols, such as 2-methyl-2-pentanol and 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran or dimethoxyethane; glycol ethers, such as monomethyl or monoethyl ethers of ethylene glycol or propylene glycol, diethylene glycol monomethyl ether, diethylene glycol monoethyl ether, butyl glycols or methoxybutanol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$–$C_6$ alkyl esters, such as butyl formate, ethyl acetate or propyl propionate; or carboxylic acid $C_1$–$C_6$ glycol esters; or glycol ether acetates, such as 1-methoxy-2-propyl acetate; or phthalic or benzoic acid $C_1$–$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone, dimethyl sulfoxide, and sulfolane.

Preferred solvents include mixtures of organic, polar solvents, examples being aliphatic acid amides, such as formamide, dimethylformamide or N,N-dimethylacetamide; urea derivatives, such as tetramethylurea, cyclic carboxamides, such as N-methylpyrrolidone, valerolactam or caprolactam; nitriles, such as acetonitrile; aromatic solvents, such as nitrobenzene, o-dichlorobenzene, benzoic acid or phenol; aromatic heterocycles, such as pyridine or quinoline; hexamethylphosphoramide, 1,3-dimethyl-2-imidazolidinone, dimethyl sulfoxide or sulfolane; or, where appropriate, mixtures of these solvents with aqueous alkalis, such as oxides or hydroxides of the alkali metals or alkaline earth metals, such as potassium hydroxide or sodium hydroxide, for example.

Particularly preferred polar organic solvents are dimethylformamide, N,N-dimethylacetamide, N-methylpyrrolidone, dimethyl sulfoxide, and sulfolane, as a mixture with potassium hydroxide or sodium hydroxide.

As the precipitation medium it is possible in theory to use all liquids which when mixed with the pigment solution reduce the solubility of the pigment to such an extent that precipitation—as far as possible, quantitative precipitation—takes place. Suitable precipitation media therefore include water, an aqueous-organic liquid or an organic liquid, with or without addition of acids or alkalis.

In the case of the pigment solutions in acid, preference is given to using water as precipitation medium; however, the water may also be used in a mixture with a preferably water-miscible organic liquid. It is also possible fully or partly to neutralize the acid in the course of the precipitation. In the case of the alkaline pigment solutions in a polar solvent, the precipitation medium is preferably water or an aqueous-organic liquid, with or without the addition of acid, or a mixture of an organic liquid with an acid.

As organic liquids for the precipitation medium it is possible to use, for example, alcohols having from 1 to 10 carbon atoms, examples being methanol, ethanol, n-propanol, isopropanol, butanols, such as n-butanol, sec-butanol, and tert-butanol, pentanols, such as n-pentanol and 2-methyl-2-butanol, hexanols, such as 2-methyl-2-pentanol and 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran or dimethoxyethane; glycol ethers, such as monomethyl or monoethyl ethers of ethylene glycol or propylene glycol, diethylene glycol monomethyl ether, diethylene glycol monoethyl ether, butyl glycols or methoxybutanol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$–$C_6$ alkyl esters, such as butyl formate, ethyl acetate or propyl propionate; or carboxylic acid $C_1$–$C_6$ glycol esters; or glycol ether acetates, such as 1-methoxy-2-propyl acetate; or phthalic or benzoic acid $C_1$–$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone, dimethyl sulfoxide, and sulfolane; or mixtures of these liquids.

In the process of the invention it is also possible to use customary auxiliaries such as surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, light stabilizers, or a combination thereof. The auxiliaries may be added at any point in time before, during or after the precipitation in the microjet reactor, all at once or in several portions. The auxiliaries may, for example, be added prior to injection to the pigment solution or to the precipitation medium, or else during the precipitation in liquid, dissolved or suspended form, by means of a separate jet, by injection into the collision point.

The overall amount of the added auxiliaries may amount to from 0 to 40% by weight, preferably from 1 to 30% by weight, in particular from 2.5 to 25% by weight, based on the crude pigment.

Suitable surfactants include anionic or anion-active, cationic or cation-active, and nonionic substances or mixtures of these agents. Preference is given to those surfactants or surfactant mixtures which do not foam in the course of the precipitation. Examples of suitable anion-active substances include fatty acid taurides, fatty acid N-methyltaurides, fatty acid isethionates, alkylphenylsulfonates, alkylnaphthalinesulfonates, alkylphenol polyglycol ether sulfates, fatty alcohol polyglycol ether sulfates, fatty acid amide polyglycol ether sulfates, alkyl sulfosuccinamates, alkenylsuccinic monoesters, fatty alcohol polyglycol ether sulfosuccinates, alkanesulfonates, fatty acid glutamates, alkyl sulfosuccinates, fatty acid sarcosides; fatty acids, such as palmitic, stearic, and oleic acid; soaps, such as alkali metal salts of fatty acids, naphthenic acids and resin acids, such as abietic acid; alkali-soluble resins, examples being rosin-modified maleate resins, and condensation products based on cyanuric chloride, taurine, N,N'-diethylaminopropylamine, and p-phenylenediamine. Particular preference is given to resin soaps, i.e., alkali metal salts of resin acids.

Examples of suitable cation-active substances include quaternary ammonium salts, fatty amine alkoxylates, alkoxylated polyamines, fatty amine polyglycol ethers, fatty amines, diamines and polyamines derived from fatty amines or fatty alcohols, and their alkoxylates, imidazolines derived from fatty acids, and salts of these cation-active substances, such as acetates, for example.

Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers; fatty acid amide ethoxylates, fatty alcohol-alkylene oxide adducts, and alkylphenol polyglycol ethers.

By nonpigmentary dispersants are meant substances which structurally are not derived by chemical modification from organic pigments. They are added as dispersants either during the actual preparation of pigments, or else often during the incorporation of the pigments into the application media to be colored; for example in the preparation of paints or printing inks, by dispersion of the pigments into the corresponding binders. They may be polymeric substances, examples being polyolefins, polyesters, polyethers, polyamides, polyimines, polyacrylates, polyisocyanates, block copolymers thereof, copolymers of the corresponding monomers; or polymers of one class modified with a few monomers from another class. These polymeric substances carry polar anchor groups such as hydroxyl, amino, imino, and ammonium groups, for example, carboxylic acid groups and carboxylate groups, sulfonic acid groups and sulfonate groups, or phosphonic acid groups and phosphonate groups, and may also be modified with aromatic, nonpigmentary substances. Nonpigmentary dispersants may also, furthermore, be aromatic substances chemically modified with functional groups and not derived from organic pigments. Nonpigmentary dispersants of this kind are known to the skilled worker, and some are available commercially (e.g., Solsperse®, Avecia; Disperbyk®, Byk, Efka®, Efka). Although several types will be mentioned below to give a representation, it is possible in principle to employ any other substances described, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids/ esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, comb dispersants comprising polyesters and acrylic polymers, phosphoric esters, triazine-derived polymers, modified polyethers, or dispersants derived from aromatic nonpigmentary substances. These basic structures are in many cases modified further, by means for example of chemical reaction with further substances carrying functional groups or by salt formation.

By pigmentary dispersants are meant pigment dispersants which are derived from an organic pigment as the parent structure and are prepared by chemically modifying this parent structure; examples include saccharin-containing pigment dispersants, piperidyl-containing pigment dispersants, naphthalene- or perylene-derived pigment dispersants, pigment dispersants containing functional groups linked to the pigment parent structure via a methylene group, pigment parent structures chemically modified with polymers, pigment dispersants containing sulfo acid groups, pigment dispersants containing sulfonamide groups, pigment dispersants containing ether groups, or pigment dispersants containing carboxylic acid, carboxylic ester or carboxamide groups.

For the pigment solution, for the precipitation medium, and where appropriate for auxiliaries as well it is possible to use different jet reaches or a different number of jets and so to realize, for example, different volume proportions that are required. With the process of the invention it is also possible, through the use of more than one crude pigment, to prepare mixtures or else, where appropriate, mixed crystals of pigments. In this case the crude pigments are preferably dissolved together and injected, although they may also be injected in the form of separate solutions.

The pigment may be isolated directly following precipitation; alternatively, it is also possible where appropriate to isolate the pigment, or not to do so, and then subject it to an aftertreatment (finish) with water and/or an organic solvent, at temperatures for example from 20 to 250° C., with or without the addition of auxiliaries.

It was surprising and was not foreseeable that the fine division by precipitation of pigment solutions would be possible in this simple and technically uncomplicated way through the collision of jets in a microjet reactor, and that it would lead to fine particles with a narrow size distribution.

The pigments obtainable in accordance with the-present invention are notable for outstanding coloristic properties; in particular, high flocculation stability, ease of dispersion, good gloss characteristics, and high color strength.

Inventively prepared pigments are suitable for pigmenting natural or synthetic organic materials of high molecular mass, such as cellulose ethers and cellulose esters, such as ethylcellulose, nitrocellulose, cellulose acetate or cellulose butyrate, for example, natural resins or synthetic resins, such as addition-polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, and polyacrylates, polyamides, polyurethanes or polyesters, rubber, latices, casein, silicones, and silicone resins, individually or in mixtures.

In this context it is unimportant whether the high molecular mass organic compounds mentioned are in the form of plastically deformable masses, casting resins, pastes, melts or spinning solutions, paints, stains, foams, drawing inks, writing inks, mordants, coating materials, emulsion paints or printing inks. Depending on the intended use it proves advantageous to utilize the pigments obtained in accordance with the invention as blends or in the form of preparations or dispersions. Based on the high molecular mass organic material to be pigmented, the pigments prepared in accordance with the invention are employed in an amount of preferably from 0.05 to 30% by weight, more preferably from 0.1 to 15% by weight.

The pigments prepared by the process of the invention may be used to pigment the industrially commonplace baking varnishes from the class of alkyd-melamine resin varnishes, acrylic-melamine resin varnishes, polyester varnishes, high-solids acrylic resin varnishes, aqueous, polyurethane-based varnishes, and also two-component varnishes based on polyisocyanate-crosslinkable acrylic resins, and especially automotive metallic varnishes.

The pigments prepared in accordance with the invention are also suitable for use as colorants in electrophotographic toners and developers, such as one- or two-component powder toners (also called one- or two-component developers), magnetic toners, liquid toners, addition-polymerization toners, and also specialty toners. Typical toner binders are addition-polymerization, polyaddition, and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may contain further ingredients, such as charge control agents, waxes or flow aids, or may be subsequently modified with these additives.

Moreover, the pigments prepared in accordance with the invention are suitable for use as colorants in powders and powder coating materials, especially in triboelectrically or electrokinetically sprayable powder coating materials that are used to coat the surfaces of articles made, for example, of metal, wood, plastic, glass, ceramic, concrete, textile material, paper or rubber.

Typical powder coating resins employed are epoxy resins, carboxyl- and hydroxyl-containing polyester resins, polyurethane resins and acrylic resins, together with customary curing agents. Combinations of resins are also used. For example, epoxy resins are frequently used in combination with carboxyl- and hydroxyl-containing polyester resins. Typical curing components (depending on the resin system) are, for example, acid anhydrides, imidazoles, and also dicyandiamide and its derivatives, blocked isocyanates, bisacylurethanes, phenolic and melamine resins, triglycidyl isocyanurates, oxazolines, and dicarboxylic acids.

Moreover, the pigments prepared in accordance with the invention are suitable for use as colorants in inkjet inks on an aqueous and nonaqueous basis, and also in those inks which operate in accordance with the hotmelt process.

Furthermore, the pigments prepared in accordance with the invention are also suitable as colorants for color filters, both for subtractive and for additive color generation.

EXAMPLES

In order to assess the properties in the coating sector of the pigments prepared in accordance with the present invention, a selection was made, from among the large number of known varnishes, of an alkyd-melamine resin varnish (AM) containing aromatics and based on a medium-oil alkyd resin and a butanol-etherified melamine resin; a polyester varnish (PE) based on cellulose acetobutyrate; a high-solids acrylic resin baking varnish based on a nonaqueous dispersion (HS); and an aqueous, polyurethane-based varnish (PUR).

The color strength and hue were determined in accordance with DIN 55986.

The millbase rheology after dispersion was evaluated on the basis of the following five-point scale:
thin
fluid
thick
slightly set
set Following dilution of the millbase to the final pigment concentration, the viscosity was assessed using the Rossmann viscospatula type 301 from Erichsen.

Gloss measurements were carried out on case films at an angle of 200 in accordance with DIN 67530 (ASTMD 523) using the "multigloss" gloss meter from Byk-Mallinckrodt.

The solvent fastness was determined in accordance with DIN 55976.

The fastness to overcoating was determined in accordance with DIN 53221.

The average particle diameter $D_{50}$ of the coarsely crystalline crude pigments was determined by means of laser light scattering.

The average particle diameter $D_{50}$ of the pigments in the pigment preparations was determined by graphical evaluation of electron micrographs.

The crystal phase was determined by means of X-ray spectroscopy. The X-spectra were recorded using CuKV radiation.

In the preceding text and in the following examples, parts and percentages are each by weight of the substances so described.

Example 1a (Fine Division with Microjet Reactor)

1636 parts of crude tetrachloro-copper phthalocyanine pigment are dissolved in 16364 parts of 96% strength sulfuric acid at room temperature. This pigment solution is pumped with a pressure of 50 bar through one nozzle with a diameter of 300 µm, of a two-jet microjet reactor, at the same time as which water with a pressure of 50 bar is pumped through the second nozzle, which likewise has a diameter of 300 µm. The two nozzles are opposite one another frontally; the two jets impinge on one another frontally in a gas atmosphere. The resulting pigment suspension is carried off by a stream of compressed air of about 0.5 m³/h, which serves simultaneously to maintain the gas atmosphere at the collision point of the jets. The compressed air stream enters perpendicularly with respect to the two jets, through an opening in the reactor housing. The exit opening for the compressed air and the pigment suspension is situated on the opposite side to the entry opening of the compressed air stream. The pigment suspension is drawn off by suction and washed to neutrality with water. A sample of the presscake is dried at 80° C. The aqueously moist presscake is stirred with water to give a 5% suspension, which is heated at 130° C. After cooling it is filtered, the solid product is washed with water, and the tetrachloro-copper phthalocyanine pigment is dried at 80° C. The specific surface area, determined in accordance with DIN 66132, is 29.2 m²/g. The average particle size $D_{50}$, determined by electron microscopy, is 26 nm, the standard deviation 11 nm.

Example 1b (Comparative Example: Conventional Fine Division in Accordance with U.S. Pat. No. 3,607,336)

38 parts of crude tetrachloro-copper phthalocyanine pigment are dissolved in 370 parts of 96% strength sulfuric acid at room temperature. This pigment solution is taken up by suction using a waterjet pump, and the pigment is precipitated in the waterjet pump. The resulting pigment suspension is filtered, and the presscake is washed salt-free with water. It is subjected to heat treatment as in example 1a. 43 parts of tetrachloro-copper phthalocyanine pigment are obtained. The specific surface area, determined in accordance with DIN 66132, is 12.6 m²/g. The average particle size $D_{50}$, determined by electron microscopy, is 34 nm, the standard deviation 20 nm.

The specific surface areas and the average particle sizes show that the pigment prepared in accordance with example 1a using the microjet reactor is the finer of the pigments. Moreover, it exhibits a significantly narrower particle size distribution. In an HS varnish system, coatings are prepared with the pigments prepared in accordance with example 1a and 1b. The millbase rheology is the same in both cases and is evaluated at 3 to 4. The pigment prepared in accordance with example 1a gives transparent and glossy coatings, which are much more strongly colored than the coatings comprising the pigment prepared in accordance with example 1b. Thus the color strength too shows that the pigment prepared in accordance with example 1a is the finer of the pigments, which in this case, advantageously, does not result in a deterioration in the millbase rheology, as is normally observed when the average particle size shifts toward lower values.

What is claimed is:

1. A process for the fine division of pigments comprising the steps of:
   dissolving coarsely crystalline crude pigments in a solvent to form a pigment solution;
   precipitating the crude pigments with a liquid precipitation medium by spraying the pigment solution and the precipitation medium through nozzles to a point of conjoint collision in a reactor chamber enclosed by a housing in a microjet reactor, wherein the reaction chamber has a gas entry side and a product and gas exit side; passing a gas or an evaporating liquid into the reactor chamber through an opening in the housing for the purpose of maintaining a gas atmosphere in the reactor chamber; and
   removing the resulting pigment suspension and the gas or the evaporating liquid from the microjet reactor through a further opening in the housing by means of overpressure on the gas entry side or underpressure on the product and gas exit side.

2. The process as claimed in claim 1, wherein the pigment solution and the precipitation medium are sprayed into the reactor chamber with a pressure of at least 10 bar.

3. The process as claimed in claim 1, wherein the temperature of the pigment solution and of the precipitation medium is from −50 to 250° C.

4. The process as claimed in claim 1, wherein the crude pigment is selected from the group consisting of perylenes, perinones, quinacridones, quinacridonequinones, anthraquinones, anthanthrones, benzimidazolones, disazo condensation pigments, azo pigments, indanthrones, phthalocyanines, dioxazines, aminoanthraquinones, diketopyrrolopyrroles, indigo pigments, thioindigo pigments, thiazineindigo pigments, isoindolines, isoindolinones, pyranthrones, isoviolanthrones, flavanthrones, anthrapyrimidines, and the mixed crystals of two or three such pigments.

5. The process as claimed in claim 1, wherein the solvent of the pigment solution is an acid with or without organic solvent.

6. The process as claimed in claim 5, wherein the acid is sulfuric acid, sulfuric acid monohydrate, oleum, chlorosulfonic acid, polyphosphonic acid or a mixture thereof.

7. The process as claimed in claim 5, wherein the organic solvent is an alcohol; glycol; polyglycol; ether; glycol ether; ketone; aliphatic acid amide; urea derivative; ester; nitrile; aliphatic or aromatic hydrocarbon; aromatic heterocycle; hexamethylphosphoramide, 1,3-dimethyl-2-imidazolidinone, dimethyl sulfoxide; sulfolane; or a mixture thereof.

8. The process as claimed in claim 1, wherein the solvent of the pigment solution is an organic, polar solvent in a mixture with an alkali.

9. The process as claimed in claim 8, wherein the organic, polar solvent is a carboxamide, a urea derivative, a nitrile, an aromatic solvent, an aromatic heterocycle, hexamethylphosphoramide, 1,3-dimethyl-2-imidazolidinone, dimethyl sulfoxide or sulfolane, individually or in a mixture.

10. The process as claimed in claim 8, wherein the organic, polar solvent is formamide, dimethylformamide, N,N-dimethylacetamide, tetramethylurea, N-methylpyrrolidone, valerolactam, caprolactam, acetonitrile, nitrobenzene, o-dichlorobenzene, benzoic acid, phenol, pyridine or quinoline.

11. The process as claimed in claim 1, wherein the precipitation medium is water or an aqueous-organic or organic liquid, with or without addition of acid or alkali.

12. The process as claimed in claim 1, wherein the fine division is carried out in the presence of from 0 to 40% by weight, based on the overall weight of the crude pigment, of one or more auxiliaries selected from the group consisting of surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

13. The process as claimed in claim 1, wherein the gas is air, nitrogen or carbon dioxide.

14. The process as claimed in claim 1, wherein a gas atmosphere is maintained in the vicinity of the conjoint collision.

15. The process as claimed in claim 1, wherein the pigment solution is sprayed to the point of conjoint collision through 1, 2 or more nozzles, and independently thereof the precipitation medium is sprayed to the point of conjoint collision through 1, 2 or more nozzles.

16. The process as claimed in claim 1, wherein the diameter of the nozzle through which the precipitation medium is sprayed is from 0.2 to 5 times that of the nozzle through which the pigment solution is sprayed.

17. The process as claimed in claim 1, wherein the pigment solution and the precipitation medium are sprayed into the reactor chamber with a pressure of from 50 to 5000 bar.

18. The process as claimed in claim 1, wherein the temperature of the pigment solution and of the precipitation medium is from 0 to 190° C.

19. The process as claimed in claim 8, wherein the alkali is sodium hydroxide, potassium hydroxide, or mixtures thereof.

20. The process as claimed in claim 1, wherein the fine division is carried out in the presence of from 1 to 30% by weight, based on the overall weight of the crude pigment, of one or more auxiliaries selected from the group consisting of surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

21. The process as claimed in claim 1, wherein the fine division is carried out in the presence of from 1 to 30% by weight, based on the overall weight of the crude pigment, of one or more auxiliaries selected from the group consisting of surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

22. The process as claimed in claim 1, wherein the diameter of the nozzle through which the precipitation medium is sprayed is from 0.3 to 3 times, that of the nozzle through which the pigment solution is sprayed.

* * * * *